UNITED STATES PATENT OFFICE.

BERTIE THOMAS PERCIVAL BARKER, OF LONG ASHTON, SOMERSET, ENGLAND.

PRODUCTION OF PECTOUS SUBSTANCES.

1,386,224.    Specification of Letters Patent.    Patented Aug. 2, 1921.

No Drawing.    Application filed November 5, 1919. Serial No. 335,873.

*To all whom it may concern:*

Be it known that I, BERTIE THOMAS PERCIVAL BARKER, a subject of the King of England, residing at Long Ashton, Somerset, England, (whose post-office address is Long Ashton, Somerset, England,) have invented certain new and useful Improvements in and in the Production of Pectous Substances, of which the following is a specification.

The present invention has for its object to produce pectous substances adapted particularly for use in the manufacture of jams, jellies and marmalades.

Various plant tissues containing pectose and its derivities and particularly those of certain fruits and vegetables, by suitable treatment can be made to yield jelly-forming substances which are primarily the cause of the jellification of preserves such as those before mentioned, and which when added in suitable quantity to any of such articles which may be naturally deficient in them, will produce any degree of jellification desired.

The production of jelly-forming substances of the character described, and generally termed pectins or pectous substances, has hitherto been proposed from crude pulps prepared from fruits rich in such material and naturally acid or acidified in the course of the process, from which pulps the sugar has been removed by expression or diffusion with water and the pectous substances subsequently extracted by a suitable solvent such as hot water, the extract so obtained being concentrated by evaporation. Such extracts possess as their essential characteristic the property of forming a jelly when combined with definite proportions of sugar and water.

Pectous extracts are subject to decomposition by the action of fungi and bacteria and must therefore be sterilized and kept subsequently under sterile conditions, e. g., in suitable germ-proof containers, or must be preserved by the addition of an antiseptic. The latter method is open to objection in the case of a food substance and the alternative of storage under sterile conditions imposes limitations in the handling of the material. The use of sugar as the preservative agent is not practicable with concentrated extracts of the type hitherto proposed since jellification ensues and the product is thus rendered unsuitable for its ultimate purpose.

The present invention refers to the production of a pectous extract which is essentially different from the foregoing in that it remains of a syrupy consistency and does not produce a jelly when combined with sugar and water, whatever proportions may be taken.

It has been discovered that the type of jellifying action herein referred to does not take place unless the pectous extract is prepared with the aid of a suitable acid, (which may be the natural acid of the fruit pulp or an added acid) or unless a suitable acid, such as tartaric acid, is added to the mixture of extract, sugar and water, in sufficient quantity to produce the desired result.

In the case of the product prepared according to the present invention the jellifying action which takes place when it is used in the manufacture of jams, etc., is dependent upon the presence of the natural acid in the fruit or fruit juices used in the preparation of the jam, etc., or, in the event of such acid being present in deficient amount, of a suitable acid added in suitable quantity.

The special advantage claimed for the product which forms the subject of the present invention is that it can be mixed with a proportion of sugar sufficiently great to give the necessary keeping qualities, so that the mixture will keep indefinitely without special sterilization and without being packed in special containers.

The term sugar as here used is intended to include in addition to cane sugar other suitable forms of carbohydrates such as other sugars (glucose, etc.) alone and mixtures such as corn syrup.

By the present invention the product may be obtained from all plant tissues containing the necessary pectose and its derivatives which yield by the treatment hereinafter described jellifying extracts of the kind above specified. Certain kinds of fruits, such as apples, and of vegetables, such as carrots, give relatively large yields; and the use of pressed apple and pear pomace, the residue of those fruits obtained after the expression therefrom of their juices as a by-product in the manufacture of cider and perry, is in particular preferred both on account of the cheapness of such material and also of the economic importance of utilizing a hitherto largely wasted by-product of an established industry. This material may be used in its freshly-pressed state or after desiccation. If allowed to remain several days after production without desiccation its quality for this purpose deteriorates.

The method of preparation according to my invention is subject to slight variation according to the nature of the material selected but is mainly as follows:—

The tissues are first disintegrated, where necessary, by suitable means, e. g., by milling or pressing, to aid the extraction of the product in the subsequent treatment. In some cases it is desirable to expose the disintegrated tissues to pressure to remove the juices and the materials already dissolved therein, in order to obtain in the ultimate product the jellifying substances relatively free from the other constituents of the tissues and in particular to remove the major portion of any soluble organic acid which may be present. In the case of cider and perry residue this part of the process is unnecessary, these operations having already been performed in the course of cider and perry making.

Where the material used is of a markedly acid character the expression of juice may not suffice to remove enough of the acid or acids present. In such cases the disintegrated tissues should be thoroughly washed with cold water to insure the provision of a sufficiently non-acid pulp for subsequent treatment, or the acid should be removed in any other suitable way, such for example as by neutralization with calcium carbonate or other suitable substance of an alkaline character.

The pulp, after this preliminary treatment where necessary, is then subjected to the action of steam, either under pressure in a suitable vessel such as an autoclave or at ordinary atmospheric pressure. The object of the steaming is to render soluble the jellifying substances in the pulp, which are naturally present mainly in a more or less insoluble form, especially in low-acid or non-acid pulps. The duration of the steaming required depends on the nature and condition of the material, on the amount of steam supplied in proportion to that of the material, and on the pressure of the steam. For apple pomace one half-hour's treatment with steam generated at sixty pounds pressure is generally sufficient.

After the pectous material is converted into a readily soluble form by the steaming process, an aqueous extract is prepared therefrom by treatment with hot or cold water by any method, (preferably by boiling in water and subsequent expression of the extract, lixiviation, or maceration) suitable for extracting the soluble material.

The steaming process and preparation of the aqueous extract can be conducted by a single continuous operation by means of an apparatus so constructed that steaming and extraction with water can be carried on simultaneously during the later stages of the steaming process, water being allowed to percolate through the steamed mass of pulp. The escaping liquor which drains away is the pectous extract and the treatment of the pulp can be continued in this manner so long as a fluid sufficiently rich in pectous matter is yielded. The residual liquid in the treated pulp is then obtained by expression and added to the bulk already secured by percolation.

By adjustment of the quantity of water used in the preparation of the extract the degree of richness in pectous material of the latter can be varied very widely. In the extreme case a thick viscous syrupy fluid, which requires no further concentration can be obtained. A more complete extraction of the pectous material, is, however, secured by the use of larger quantities of water, in which case the relatively-dilute form of extraction resulting can with advantage be concentrated. Concentration to any desired degree can be accomplished in any form of evaporator which permits of concentration without decomposition of the pectous material; which decomposition will be indicated by testing the jellifying character of the concentrate. For example, a concentrate can be readily secured which, when added to a syrup of sugar and water in the proportion of one part of the concentrate to ten parts of sugar and five parts of water will quickly form a jelly on addition of about one-eighth part of tataric or other suitable acid; all the parts being by weight.

It is to be understood that concentration is not essential but is desirable for the purpose of reducing the bulk of the material.

The extract may be stored under sterile conditions in suitable containers and will then keep indefinitely; or it may be preserved from decomposition by the addition of a suitable preservative, in which case it can be stored in casks or any other convenient vessels. The form of preservation by addition of sugar referred to above is of special utility in view of the use of the material in the manufacture of jam, the mixture not only affording jellying properties but also permitting the reduction of the amount of sugar used in the manufacture of the jam by the quantity added to the pectous extract thus preserved.

As a practical illustration of the uses of my invention and its advantages the following may be cited:—

Five pounds of extract added to ten pounds of sugar produces a pectin-sugar which will keep good for a practically indefinite period under ordinary atmospheric conditions. If this fifteen pounds of pectin-sugar be added to say from twenty-five to forty pounds of strawberries and forty pounds of sugar, a jelly will be produced on boiling in the usual way until the yield is say from seventy-five to ninety pounds in weight according to the weight of the strawberries used. Strawberries have been given as an example by reason of their known difficult jellifying character; and if the particular kind of strawberry used should be deficient in acid content, a suitable acid should be added to the boiling.

I claim—

1. A non-jellifying pectous concentrate from which the natural acid has been removed.

2. The herein described process for producing pectous substances from plant tissue containing pectose and its derivatives, consisting in removing the natural acid therefrom, drying the residual pulp, subjecting the same to the action of steam to render the pectous substance soluble, and employing a solvent to extract the pectous substances from the steamed pulp.

In testimony whereof I have hereunto set my hand in presence of two subscribing witnesses this seventeenth day of October, 1919.

BERTIE THOMAS PERCIVAL BARKER.

Witnesses:
F. W. GOLBY,
H. C. CARPENTER.